United States Patent
Visser et al.

(10) Patent No.: US 9,914,588 B2
(45) Date of Patent: Mar. 13, 2018

(54) SYSTEM FOR STORAGE AND/OR DISPENSING OF PRODUCTS AND/OR PACKAGINGS

(71) Applicants: VISSER 'S-GRAVENDEEL HOLDING B.V., 's-Gravendeel (NL); VISCON B.V, 's-Gravendeel (NL)

(72) Inventors: Anthony Visser, 's-Gravendeel (NL); Adrianus De Vos, 's-Gravendeel (NL); Wouter Johannes Van Den Berg, Krimpen aan den IJssel (NL)

(73) Assignee: ASDA Stores Limited, Leeds (GB)

( * ) Notice: Subject to any disclaimer, the term of this patent is extended or adjusted under 35 U.S.C. 154(b) by 182 days.

(21) Appl. No.: 14/389,118

(22) PCT Filed: Mar. 26, 2013

(86) PCT No.: PCT/NL2013/050222
§ 371 (c)(1),
(2) Date: Sep. 29, 2014

(87) PCT Pub. No.: WO2013/147597
PCT Pub. Date: Oct. 3, 2013

(65) Prior Publication Data
US 2015/0045944 A1    Feb. 12, 2015

(30) Foreign Application Priority Data

Mar. 30, 2012  (NL) ...................................... 2008573
Oct. 15, 2012  (NL) ...................................... 2009632

(51) Int. Cl.
*G06F 7/00*   (2006.01)
*B65G 1/137*  (2006.01)
(Continued)

(52) U.S. Cl.
CPC ........... *B65G 1/1378* (2013.01); *A01G 9/143* (2013.01); *A01G 31/06* (2013.01); *B65G 1/0435* (2013.01); *Y02P 60/216* (2015.11)

(58) Field of Classification Search
USPC ....................................................... 700/216
See application file for complete search history.

(56) References Cited

U.S. PATENT DOCUMENTS 4,372,218 A * 2/1983 Ostlund .................. E01B 25/26
                                                   104/103
4,379,602 A    4/1983 Iemura et al.
(Continued)

FOREIGN PATENT DOCUMENTS

CH          697385 B1    9/2008
CN         2503036 Y     7/2002
(Continued)

OTHER PUBLICATIONS

International Search Report in counterpart international application No. PCT/NL2013/050222, dated Jul. 16, 2013; 5 pages.

*Primary Examiner* — Kyle O Logan
(74) *Attorney, Agent, or Firm* — Schmeiser, Olsen & Watts LLP (57) ABSTRACT

The present invention relates to a storage and dispensing system for products and/or packagings. The system (1) comprises at least one carrier (3) with at least a bottom (34) which defines thereon a space for the products and/or packagings, a storage area (2), such as a storage rack or shelving system, for selectively accommodating the carrier, and at least one transporter (4) for selective displacement of the carrier from and/or to and into and/or out of the storage area. In a situation where it is accommodated in the storage area the carrier comprises a gripping element (31) on a side oriented outside the storage area, and the transporter comprises a gripping device (23) acting on the gripping element at least during displacement of the carrier into and/or out of the storage area. Space can thus be saved in the storage area laterally of carriers placed therein, and a compact configuration of the storage area can be realized.

18 Claims, 10 Drawing Sheets

(51) Int. Cl.
*A01G 9/14* (2006.01)
*B65G 1/04* (2006.01)
*A01G 31/06* (2006.01)

(56) References Cited

U.S. PATENT DOCUMENTS

| | | | |
|---|---|---|---|
| 4,574,962 A | | 3/1986 | Tabler et al. |
| 4,656,949 A | * | 4/1987 | Ragot .................. B65G 1/0435 104/172.1 |
| 2008/0188977 A1 | * | 8/2008 | Palmer .................. G06Q 10/08 700/215 |
| 2012/0137720 A1 | * | 6/2012 | Ueda ..................... F25D 17/042 62/407 |

FOREIGN PATENT DOCUMENTS

| | | |
|---|---|---|
| CN | 101784465 A | 7/2010 |
| EP | 0272340 A1 | 6/1988 |
| FR | 2533198 A1 | 3/1984 |
| GB | 1083116 A | 9/1967 |
| JP | 10139110 A | 5/1998 |
| JP | 2005067749 A | 3/2005 |

\* cited by examiner

SYSTEM FOR STORAGE AND/OR DISPENSING OF PRODUCTS AND/OR PACKAGINGS

The present invention relates to a storage and dispensing system for products and/or packagings. Many systems are known. The known systems all have shortcomings in respect of a desired high degree of automation, or become so complex that this results in high susceptibility to malfunction and failure.

Systems such as those to which the present invention relates serve for instance for automated shopping, stock control, order-picking or buffer effect between operational processes.

The present invention has for its object to provide a further improvement in respect of a further increase in the degree of automation to be obtained, while simplicity and robustness have to be achieved at the same time.

Provided for this purpose according to the present invention is a system which is distinguished by the combination of measures and features in accordance with the appended independent system claim. The carrier is displaceable with the product or the packaging thereon from and/or to and also in and/or out of the storage area using the transporter, and the intended degree of automation can thus be achieved in that the carrier can thus be placed for an optionally longer period of time in the storage area using the transporter and can also be removed again therefrom. Because the carrier in a situation where it is accommodated in the storage area comprises a gripping element on a side oriented outside the storage area, and the transporter comprises a gripping device acting on the gripping element at least during displacement of the carrier into and/or out of the storage area, the carrier can be accommodated close-fittingly in the storage area without the need to provide additional space in the storage area laterally along the carrier for gripper arms or the like which must extend along the carrier in the storage area in order to displace the carrier into and/or out of the storage area. Space can thus be saved in the storage area laterally of carriers placed therein, and a compact configuration of the storage area can be realized.

The present invention can be implemented in many preferred embodiments, several of which are defined in the dependent claims, to which the present invention is by no means limited.

In a possible embodiment the system according to the invention has the features that in a situation where it is placed in the storage area the carrier comprises a flange along or at at least one edge oriented outward out of the storage area. The flange forms here at least a part of a gripping element of the carrier according to the invention and provides a gripping option here for the gripping device of the transporter in order to grip and displace the carrier into and/or out of the storage area. It can be favourable here for the transporter to comprise a gripping device which is configured to act selectively on the flange and which can even lift the carrier to some extent, for instance over an edge on the storage area. It can be favourable here for the flange to comprise a side element and for the gripping device to comprise a rod for moving under the flange and behind the side element. Fingers or teeth can be utilized as alternatives to grip the carrier at the said location. A rod has the advantage that it can be longer than the side of the carrier with the flange and the side element. A chain drive can thus engage on the rod at either end of the rod and, by moving the rod upward against the flange, the carrier can be carried along with the rod, and even lifted, or can in any case be displaced into and/or out of the storage area.

In a possible embodiment the system according to the invention has the features that the storage area comprises at least two shelving systems, racks or cabinets disposed opposite each other, and the transporter is displaceable therebetween. This also contributes toward a configuration which is compact and can be highly automated.

Additionally or alternatively, the system according to the invention can have the feature that the storage area comprises at least two levels disposed one above the other in a shelving system configuration, wherein the transporter is displaceable along at least one side thereof. A highly efficient use of space can thus be realized with one of the two measures, this being still further enhanced in an embodiment with both measures.

In a possible embodiment the system according to the invention has the features that the transporter connects to at least one of a feed and a discharge for respectively supplying and discharging the carrier respectively to and from the storage area. A further improvement in the degree of automation can hereby be realized.

In an embodiment with at least one of a feed and a discharge, the system can further comprise: a processing station located opposite the at least one of the feed and the discharge relative to the storage area for the purpose of processing the carrier in respect of the product and/or the packaging. At the side of the feed an entrance for unloading transport means such as trucks can be arranged and at the side of the discharge customers can have the products and/or packagings delivered so as to provide for instance an automated shop.

In an embodiment wherein the transporter defines a path of movement for displacement of the carrier, the processing station will lie along the path of movement. The carrier can be carried out of its path of movement to the processing station so that the feed and discharge need not stop in order to feed or discharge other carriers when a relevant carrier arrives at a processing station. In such an embodiment the system can have the further feature that the processing station defines a side track relative to the feed and the discharge. This is understood to mean that the side track can per se also comprise transport means.

In a possible embodiment the system according to the invention has the feature of a control for at least the transporter. The control can thus cause the movements and displacements of the carrier to proceed in controlled manner. It is even possible to envisage embodiments in which the control can determine the position of each carrier, for instance with barcodes or RFID sensors, in order to remove the correct carrier from the storage area, and/or to place a determined carrier at an available free position in the storage area. It is also possible to store in a memory where the carrier is, for instance in the storage area, in order to realize such an objective. This location can optionally even be linked to information about shelf-life of products, optionally in packagings, so as to adapt dispensing management hereto or even remove products with a short remaining shelf-life from the storage area in automated manner.

In a possible embodiment the system according to the invention has the feature that in a situation where it is placed in the storage area the carrier comprises an outward oriented side wall. It is thus possible to at least partially close an entrance to the storage area at the location for accommodating the carrier. It is further possible here that the side wall comprises a seal round substantially the whole periphery thereof, or in any case closes a formerly open entrance to a space in the storage area. The entrance to the interior of the storage area can thus be sealed or closed with the side wall of the carrier when the carrier is accommodated in the storage area.

In a possible embodiment the system according to the invention has the feature that the storage area comprises at least one recess for receiving the carrier therein. Because the carrier can be gripped by the transporter on the front side thereof relative to the storage area—the outward oriented side of the carrier in the situation where it is accommodated in the storage area—the recess need not be broader than the width of the carrier and space can be saved in the storage area. Furthermore, the above stated side wall can cover the whole opening or entrance to the recess in the situation accommodated in the storage area, and the recess can be at least substantially wholly closed with this side wall, for instance in order to close off a cooled recess from the surrounding area.

In a preferred embodiment the recess can thus comprise a cooling. Alternatively, a packaging, box, container or case can comprise or contain its own cooling (actively, for instance in the form of a cooling element, or passively, for instance in the form of an accommodation for introducing therein a cooled cooling element or a quantity of dry ice, or frozen $CO_2$).

In an embodiment with a recess in the storage area and a seal on the side wall, the system can have the feature that the recess defines an entrance for selective infeed or removal of the carrier by means of the transporter, and the entrance to the recess can be substantially closed with the seal of the side wall of the carrier in a situation where the carrier is received in the recess. In an embodiment where the storage area comprises one or more than one recess, the at least one recess can be enclosed by walls of the storage area. It is likewise possible for a group of recesses to be collectively enclosed by walls of the storage area. For cooling or heating purposes cavity walls can be applied with holes or openings allowing flow of conditioned air, such as heated or cooled air, into the recess or recesses so as to thus be able to realize heating or cooling of the space or spaces defined by the recess or recesses. In conventional systems space for such cavity walls would be additional to the space required for the purpose of gripping edges of carriers during insertion or removal thereof. According to the present invention it is possible to save space as set forth above, whereby the limited additional space necessary for cavity walls for the purpose of conditioning spaces, whether or not defined by a recess or recesses, is available without loss of space compared to previous systems, but with the added functionality of integrated air-conditioning.

It is noted that the present invention further relates per se to a carrier and a transporter to the extent these are designed and configured for use in a system according to the present invention.

The present invention will be further elucidated hereinbelow on the basis of exemplary embodiments thereof with reference to the accompanying drawing. Reference numerals will be used here for the same and similar components, elements and aspects, irrespective of whether they form part of different embodiments. The exemplary embodiments shown in the drawings should in no way be interpreted as limitative for the present invention. These are only examples of possible embodiments within the scope of the present invention as defined particularly in the single independent main claim number 1, within the scope of which also fall more and other embodiments than only those shown and described below in the accompanying drawing. In the drawing:

Figure 1:
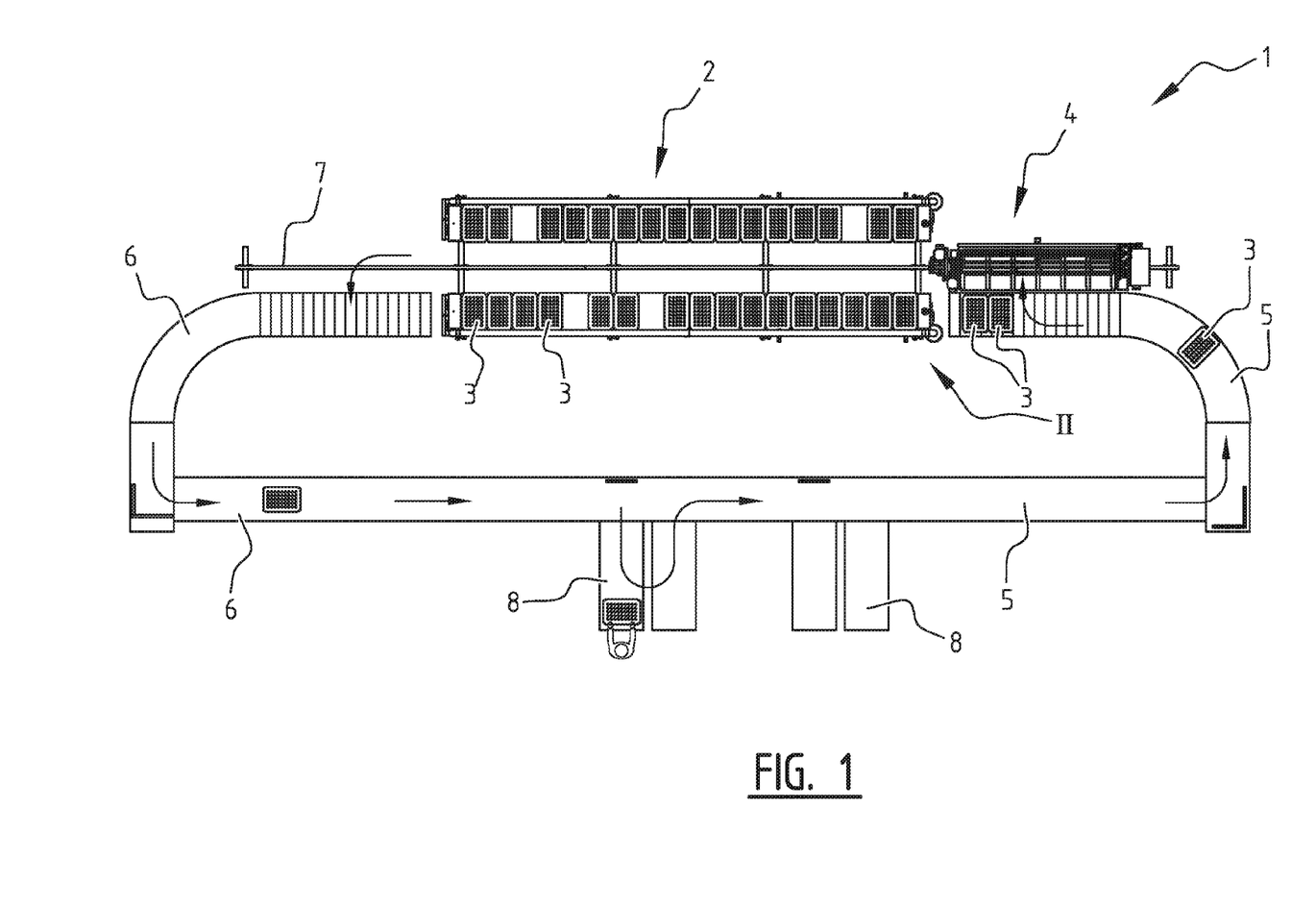
FIG. 1 is a schematic top view of a first embodiment of a system according to the present invention.
Figure 13:
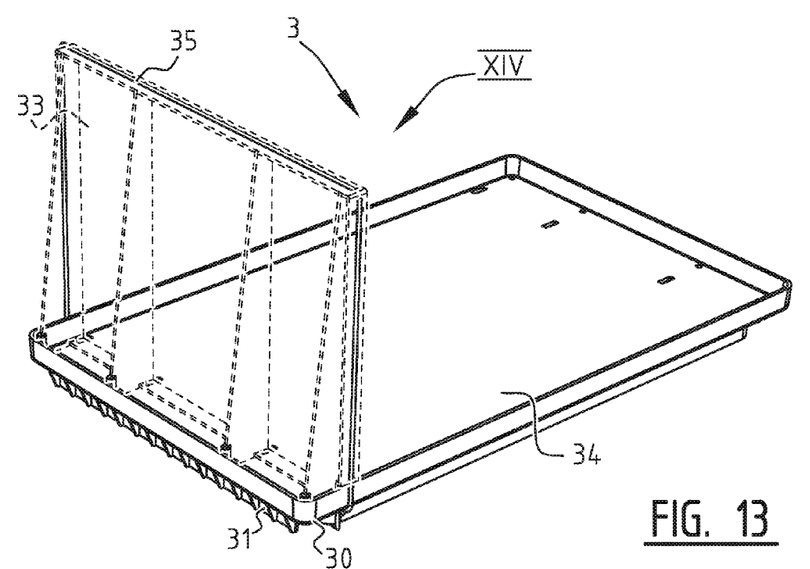
FIG. 13 is a perspective view of a carrier with a seal according to the present invention.

FIG. 1 shows a system 1 according to the present invention. System 1 comprises a storage area 2 for storing carriers 3. As shown in FIG. 13, each carrier 3 comprises at least a bottom 34 having thereon a flange 30 and a side element 31. Other gripping elements are also or alternatively possible, such as a bracket, hook and so on.

The carrier 3 shown in FIG. 13 also comprises a single, substantially optional side wall 33 which, in the view of FIG. 13, extends upward from the bottom 34 at some distance behind side element 31. In the situation accommodated in storage area 2 the flange 30, and in any case side element 31, will protrude from storage area 2 as possible embodiment of a gripping element for engagement by a transporter 4, as will be described below. Carrier 3 can further comprise other side walls (not shown) in order to form a reservoir-like carrier, for instance for the purpose of receiving therein plant material such as seed which must be cultivated into young plants. Optimum conditions can be created for this purpose in storage area 2, even per individual carrier for instance. A wall can be arranged round storage area 2 with sluices or doors for admitting the transporter 4. A feed 5 extends to an end point of the path of movement of transporter 4 and a discharge 6 extends from another end point of the path of movement of transporter 4. Carriers 3 delivered along feed 5 can be taken up by transporter 4 which can then travel into storage area 2. To the left and right of the path of movement of transporter 4 are placed racks with shelf-like or reservoir-like supports or supports forming guide surfaces enabling selective placing of carriers 3 thereon or therein. Since carrier 3 comprises at least the bottom 34, supports in the form of ridges in the racks on either side of bottom 34 of carrier 3 can suffice for placing of carrier 3 thereon.

Transporter 4 is displaceable along a guide 7 extending between end points outside storage area 2, whereby the path of movement of transporter 4 connects to the end of feed 5 and the beginning of discharge 6. Guide 7 is shown in FIG. 2 in the embodiment of a rail.

Processing stations 8 are disposed in a transition area between feed 5 and discharge 6. Employees can be assigned to processing stations 8 and can place products, packagings or plant material on the bottom 34 of carriers 3. Diverse operations can be performed at processing stations 8, which can also take place in automated manner without employees.

Figure 2:
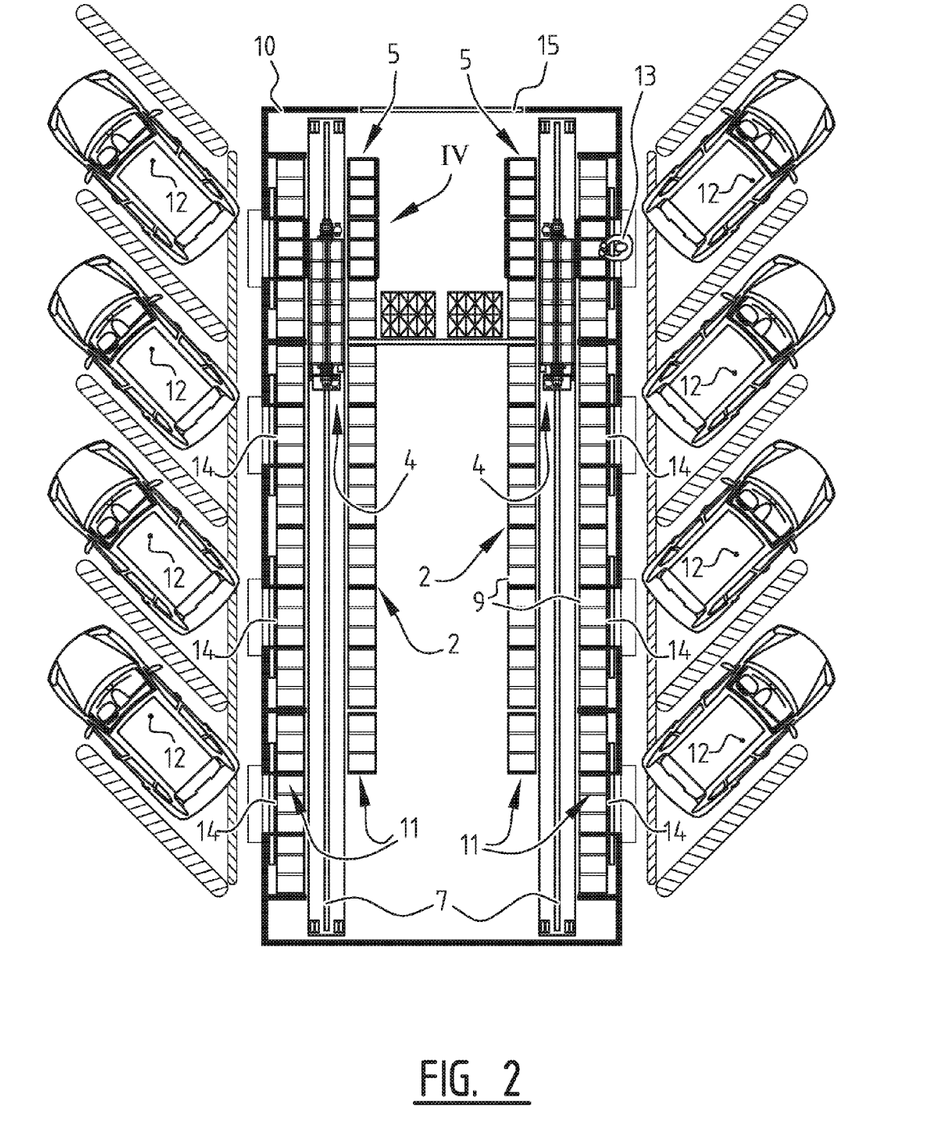
FIG. 2 is a top view of a system according to the present invention.

Shown in FIG. 2 is that storage area 2 comprises two pairs of shelving systems, each shelving system 11 of which comprises a frame 9. Storage area 2 is placed in a building 10 and access to the building 10 can be secured in order to safeguard products or packagings in shelving systems 11 against theft.

FIG. 2 shows two pairs of shelving systems 11 and rail 7 lies between each pair of shelving systems 11.

At the building 10 cars 12 can be parked which may belong to customers or buyers 13 who can have an order delivered at counter 14. Such an order can be entered on the spot or in advance and remotely, for instance via a website or a so-called app. The order can be retrieved from shelving systems 11 of storage area 2 by means of transporter 4 which is displaceable over or along guide 7 to a location along shelving systems 11 in order to fetch a relevant order. A control can keep track of where each product is, particularly in respect of carrier 3 and the location thereof in shelving systems 11, so that the relevant order can be collected for a customer at counter 14.

In the embodiment of FIG. 2 a feed 5 is provided at a door 15. Suppliers can carry products and packagings through door 15 into building 10, after which transporter 4 can be controlled for the purpose of carrying the products and/or packagings to a destination in shelving systems 11 once the products and/or packagings have been placed on carriers 3 by the supplier or an employee forming part of the system. Counters 14 thus form at least a part (or even the entirety) of the discharge, in similar manner to discharge 6 in FIG. 1.

Figure 3:
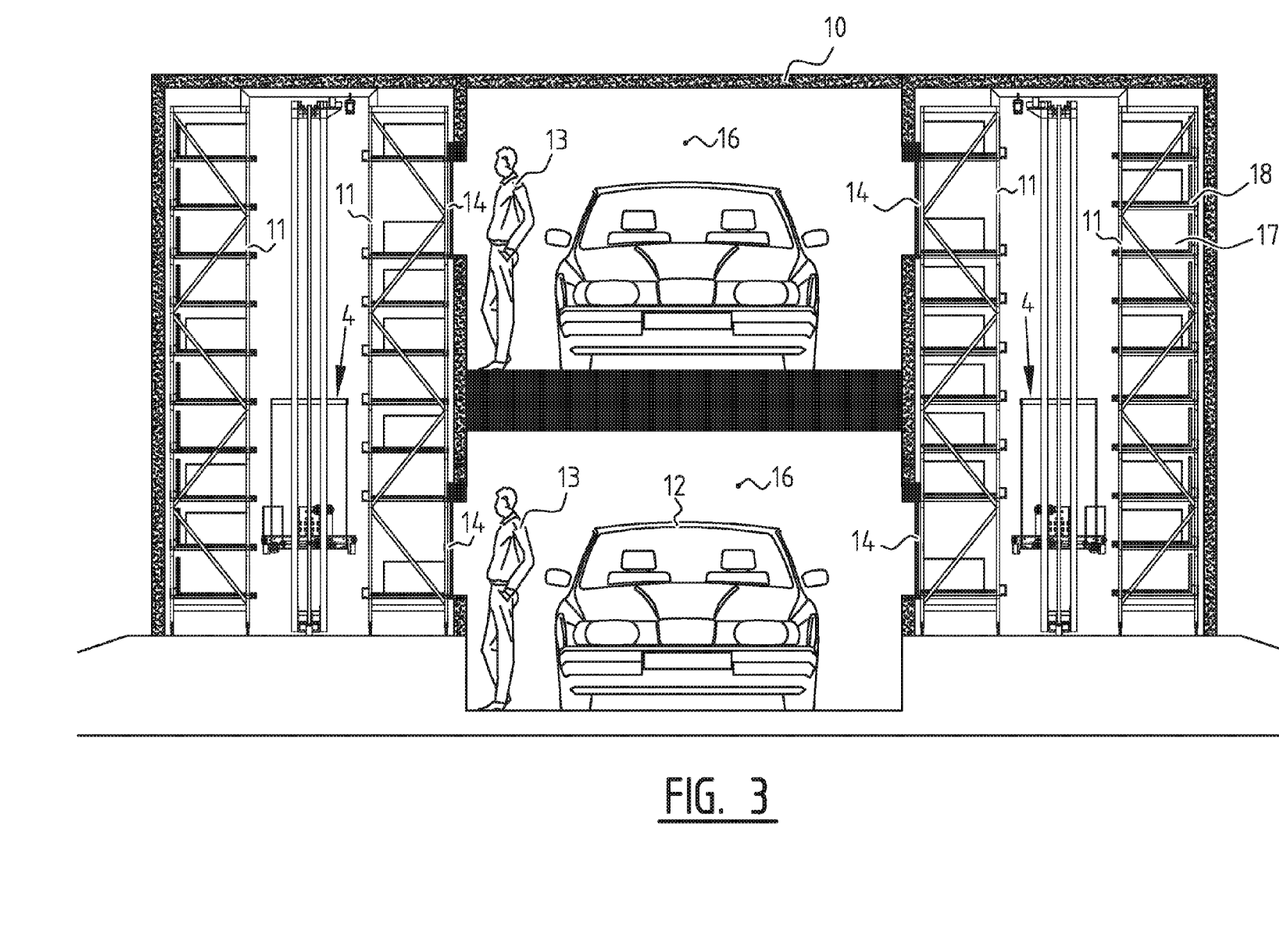
FIG. 3 is a front view of an alternative or additional embodiment according to the present invention.

FIG. 3 is a front view of an alternative or additional embodiment of a system according to the present invention in a building 10. Customers 13, and perhaps also suppliers (not shown) can drive at two levels through the building 10 in a central corridor 16 between the pairs of shelving systems 11 and take receipt of (or deliver) goods at a counter 14. In the embodiment shown in FIG. 3 two pairs of shelving systems 11 are thus also disposed in order to form the storage area, with a transporter 4 movable therebetween.

FIG. 3 also shows that some carriers 3 are empty, such as at location 17. These carriers 3 are therefore available to be taken by transporter 4 to a feed 5 or counter 14 so that products and/or packagings can be received thereon, and carriers 3 are then returned to the same or another location in shelving systems 11. A carrier 3 with a product or packaging thereon is shown schematically at location 18 in shelving system 11 on the right-hand side of the building 10 shown in FIG. 3.

Figure 4:
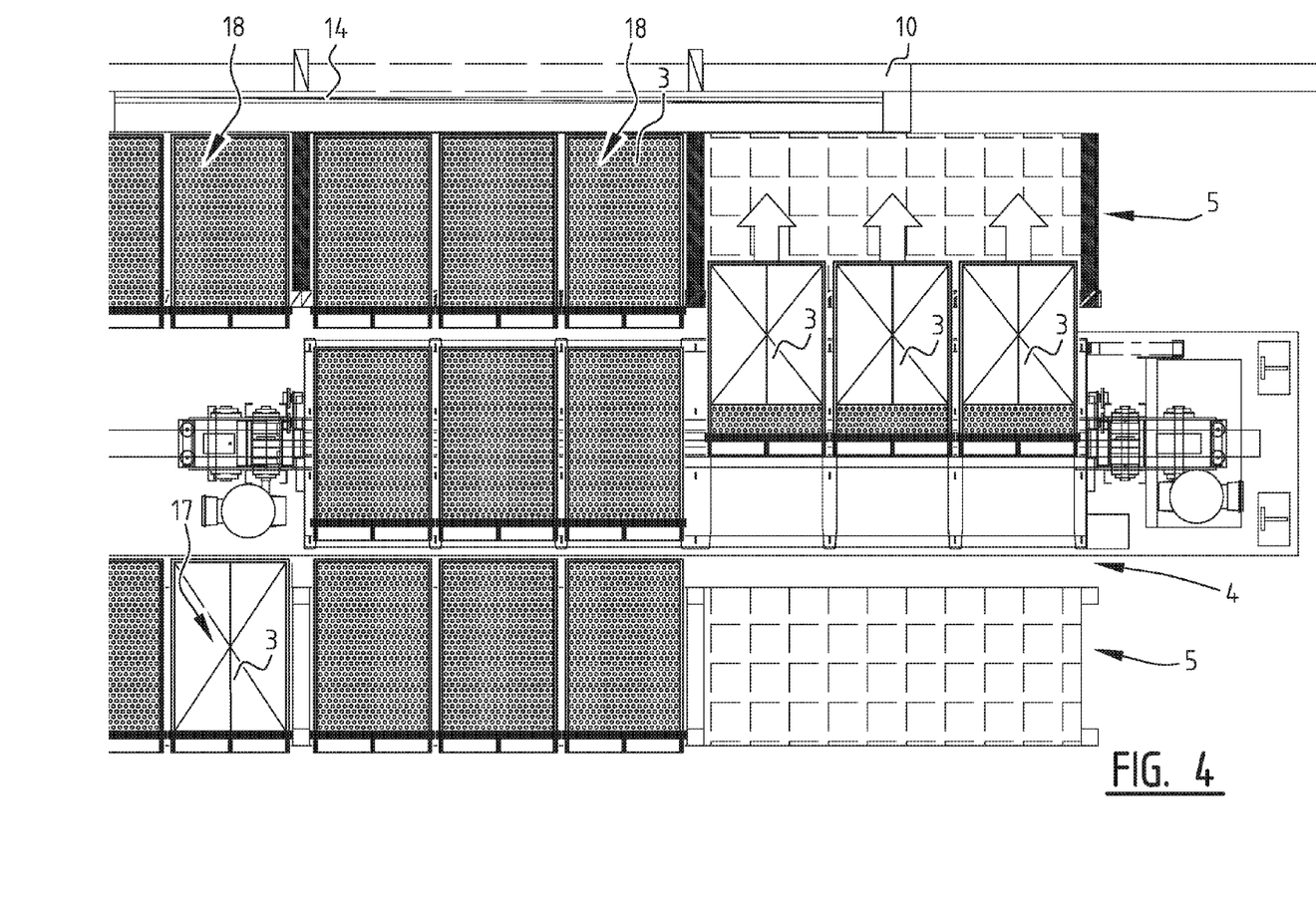
FIG. 4 shows a view in the general direction of arrow IV in FIG. 2.

Shown in FIG. 4 is how transporter 4 can be utilized to place empty carriers 3 ready at a feed in order to enable a supplier to place products and/or packagings thereon. The empty carriers 3 can be placed ready in the direction of the arrows in FIG. 4 and, once products and/or packagings have been placed thereon, can be removed in opposite direction from feed 5 and stored in shelving systems 11 until the time at which a customer 13 purchases the relevant products and/or packagings at a counter 14 and they have to be displaced thereto, once again by means of transporter 4. It is noted that when products and/or packagings are supplied an association is preferably recorded between carrier 3 and the products for the purpose of a control which must later be able to find the packagings and/or products again in shelving systems 11 for delivery thereof to a customer 13 at a counter 14.

Figure 5:
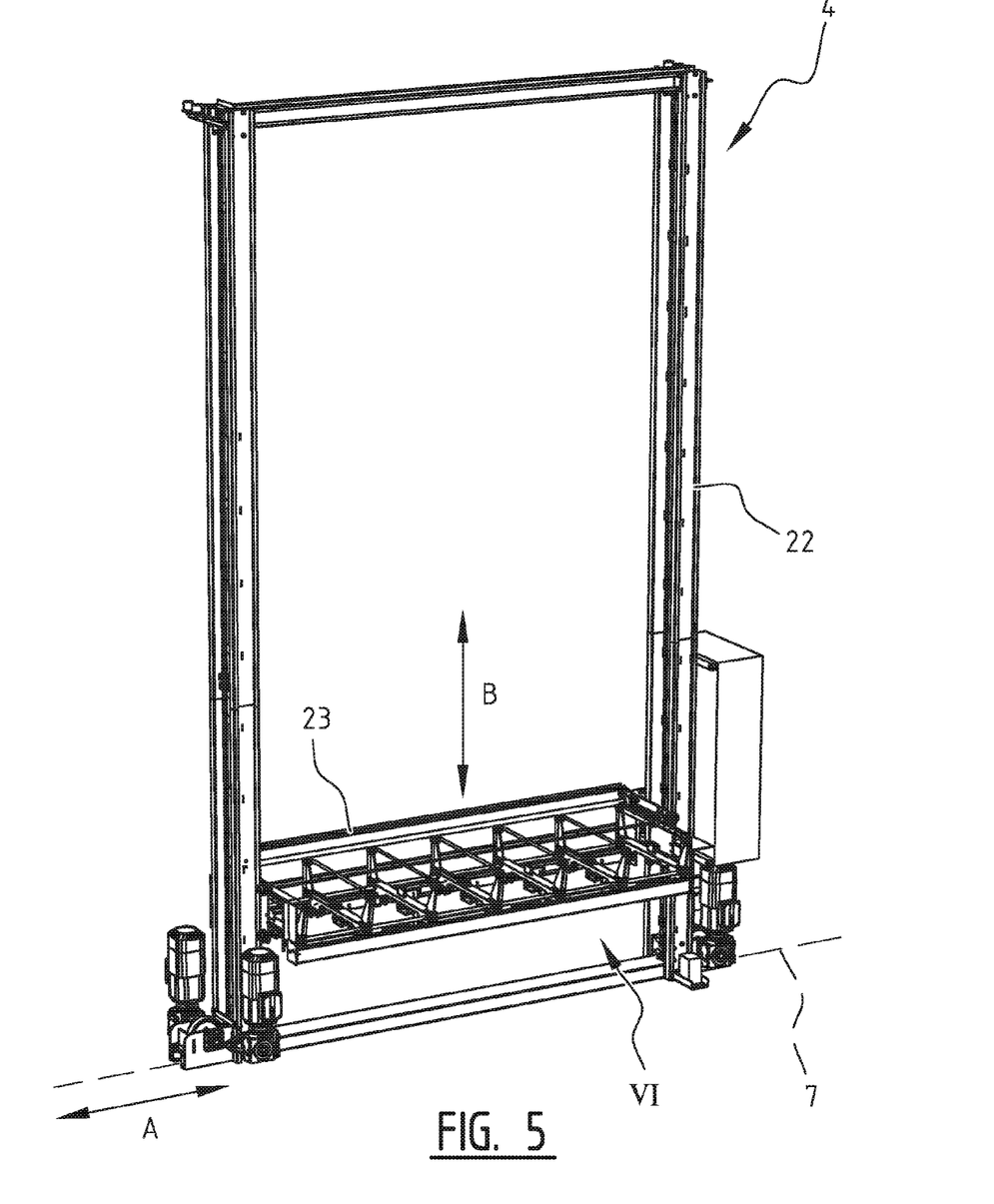
FIG. 5 is a perspective view of a transporter for or in a system according to the present invention.
Figure 7:
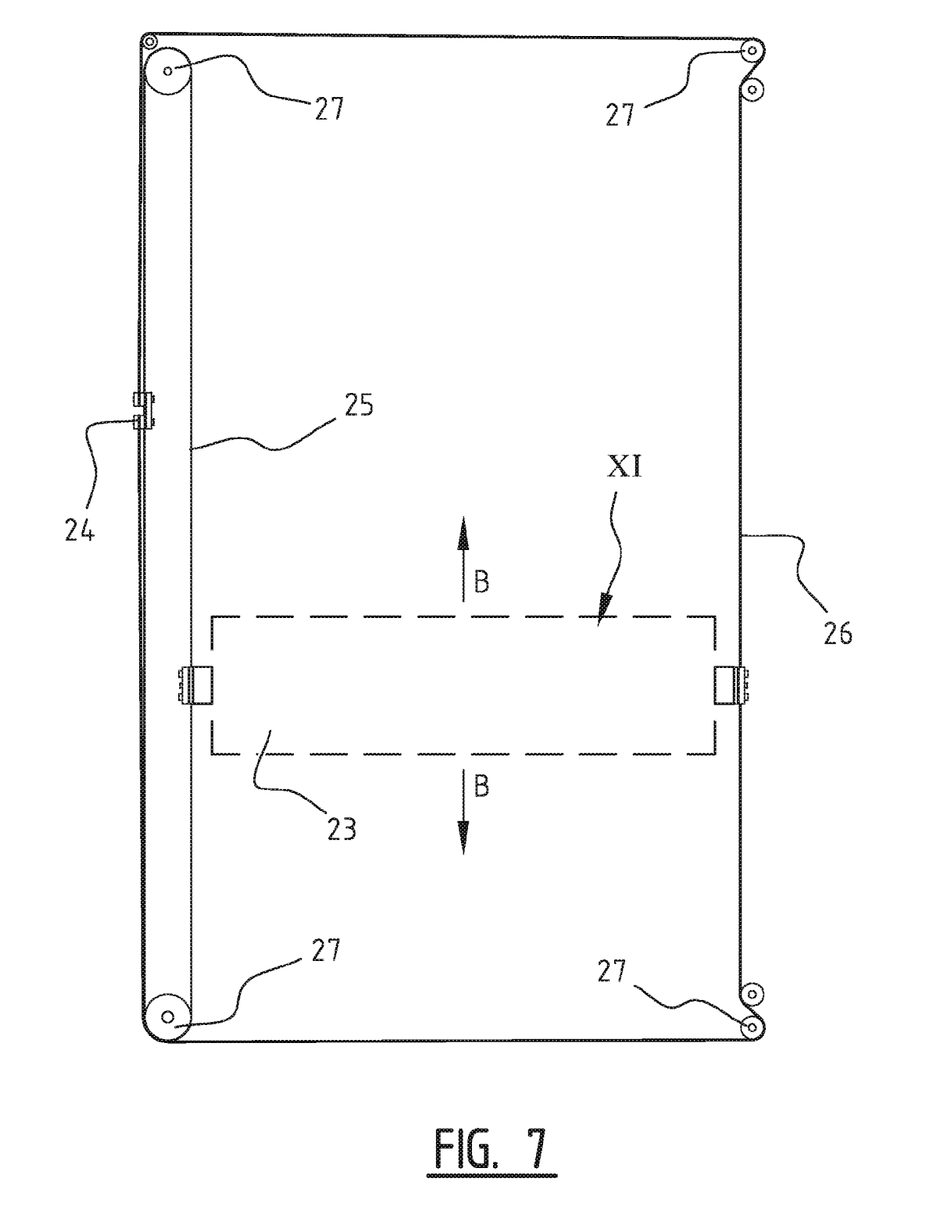
FIG. 7 shows a lift mechanism for the part of the transporter of FIG. 5 shown in FIG. 6.

FIG. 5 shows transporter 4 in more detail and on its own. Transporter 4 comprises a framework 22 which is displaceable over rail or guide 7 in FIG. 5 in the direction of double arrow A. Arranged in framework 22 is a gripper 23 which is movable up and downward in the direction of double arrow B, as also shown in FIG. 7, i.e. with a cable system. Two cables are mutually attached here with a coupling piece 24. A first outer end of gripper 23 is attached to a first cable 25, while the other outer end of gripper 23 is attached to second cable 26. Cables 25, 26 are trained in separate closed loops around reversing wheels 27, wherein at least one of the reversing wheels 27 is connected to a drive motor (not shown). Driving the relevant reversing wheel 27 using the motor (not shown) sets both cables 25, 26 into motion for the purpose of moving gripper 23 up and downward in the direction of double arrow B.

Figure 6:
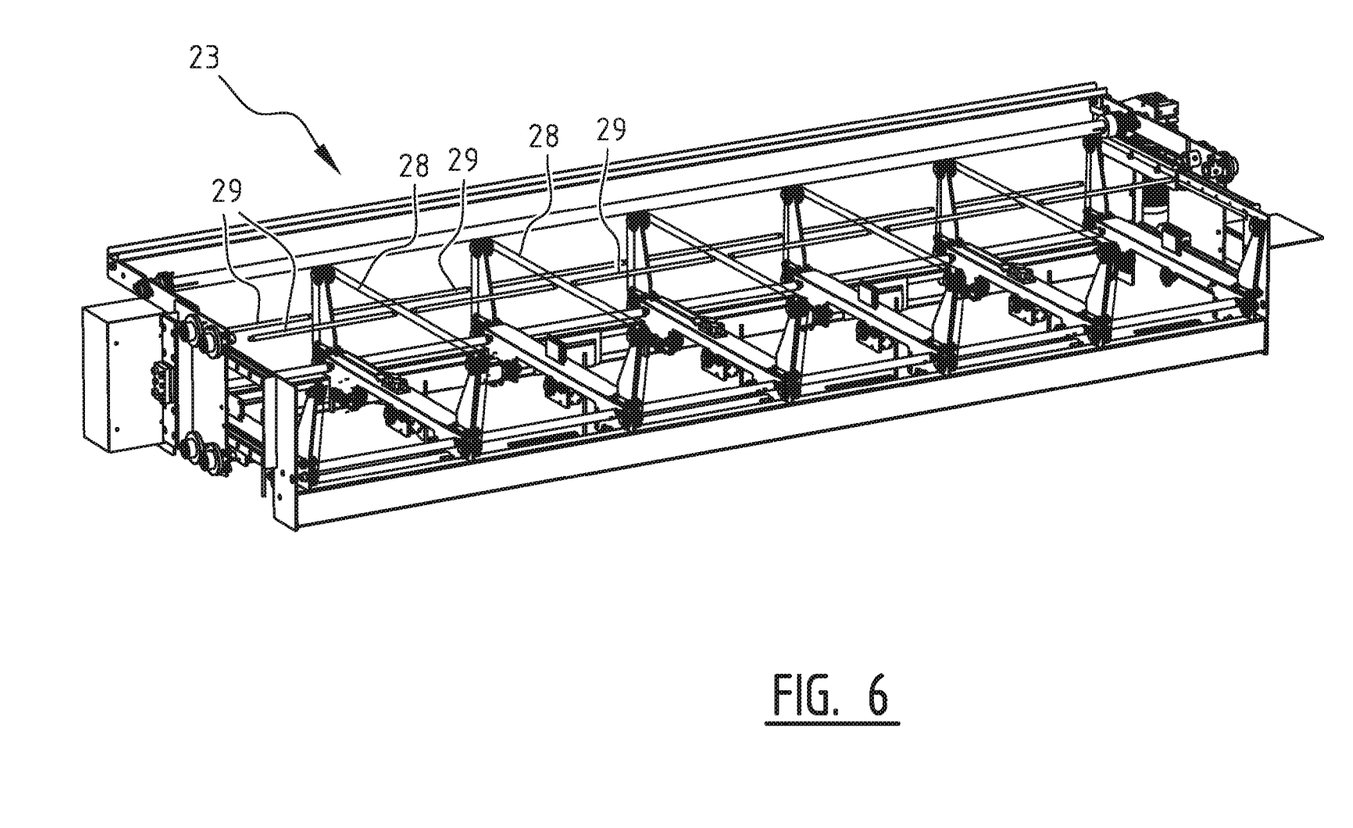
FIG. 6 shows in more detail a part of the transporter of FIG. 5 designated with arrow VI.
Figure 9:
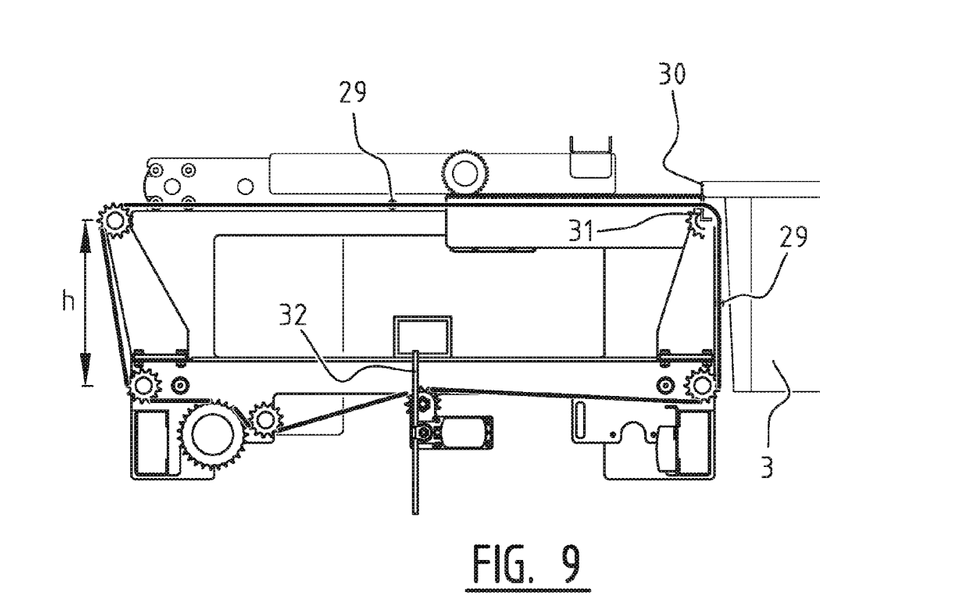

Gripper 23 is shown in more detail in FIG. 6. A schematic side view of gripper 23 is shown in FIG. 9. Gripper 23 comprises chains 28 trained in closed loops around reversing wheels. Arranged on chains 28 are rods 29 which can move around with chains 28 in the loop defined by each of the chains 28 and the reversing wheels, such as reversing wheel 31 in FIG. 9. Each chain 28 can preferably be driven separately, perhaps with a single motor and an appropriate transmission to each of the separate chains 28. Rods 29 serve to grip and remove a carrier from shelving system 11 in the manner to be further described below. The reverse movement is of course also possible.

Figure 8:
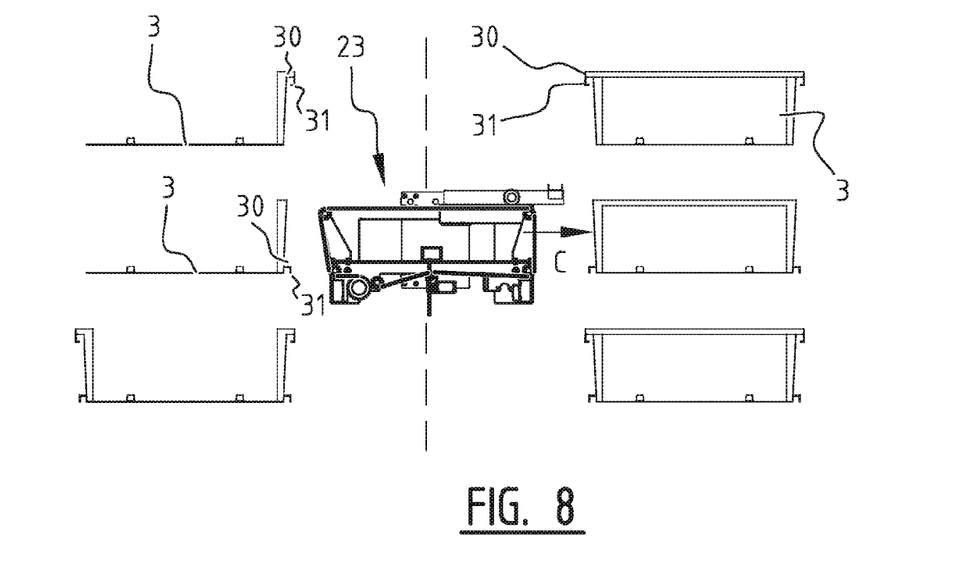
FIG. 8 and FIG. 9 show the operation of the transporter during picking up or storing of carriers.

FIG. 8, and FIG. 9 in larger view, show side views of gripper 23, with a number of carriers 3 in FIG. 8. From the position shown in FIG. 8, which can be reached by appropriate control of transporter 4 in the direction of arrows A and B in FIG. 5 and FIG. 7, gripper 23 is moved in the direction of one of the carriers 3 in the direction of arrow C.

Each carrier 3 has a flange 30 and a side element 31 at an angle to the flange 30. Different carriers 3 in FIG. 8 have the combination of a flange 30 and a side element 31 at different locations. Some carriers 3 in FIG. 8 form reservoirs (on the right in FIG. 8) and other embodiments (on the left in FIG. 8) are no more than the bottom with the optional side or front wall 33 (top left and centre) or with a front and a rear wall (bottom left). With a front wall 33 or in a reservoir-like embodiment the combination of flange 30 and side element 31 can be arranged high and/or low on carrier 3, although in a variant with only a bottom 34 this combination must be arranged on this bottom 34. A partition or the like is then preferably further arranged behind this combination for the rod 29 to push against when carrier 3 must be placed, and not removed, in (a recess of) storage area 2 or the shelving systems 11 thereof.

Figure 14:
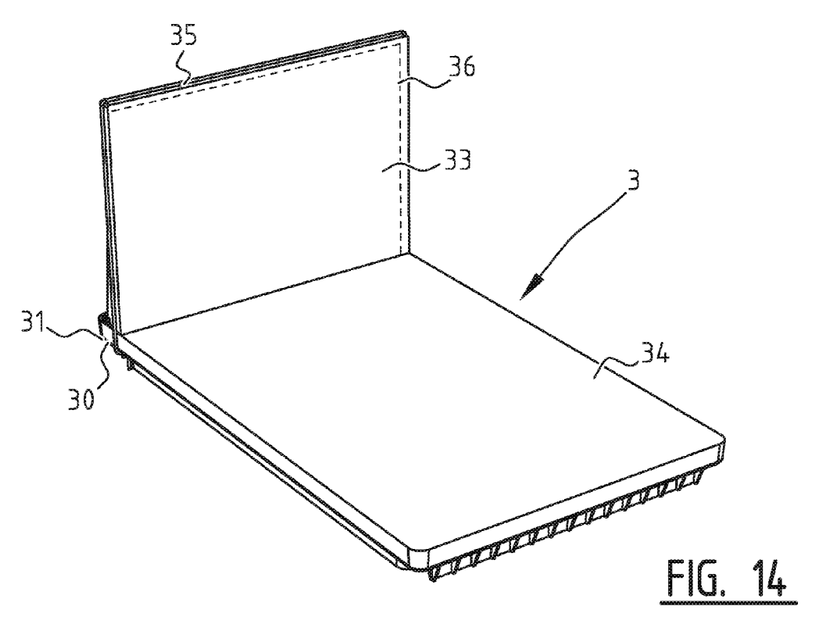
FIG. 14 shows a view in the direction of arrow XIV in FIG. 13 of a carrier with an additional or alternative seal.

As shown in FIG. 14, front wall 33 of carrier 3 can comprise a seal 35 round the periphery thereof. An additional or alternative seal 36 can be arranged against a rear surface of front wall 33. Seal 35 and/or 36 can form respectively an abutment against an inner edge of an opening to the recess and a front surface of a wall against or on the shelving system 11 with the opening to the recess in this front surface. Seals can be particularly favourable when recesses for receiving the carrier are formed in the storage area and these recesses comprise for instance a cooling. The coolness can thus be confined to the recess. The cooling can be collective for more than one recess or even a whole shelving system 11 or pair of shelving systems 11.

Chains 28 of gripper 23 are driven such that rods 29 enter the space defined by flange 30 and side element 31. With further ascending movement of rods 29 the carrier 3 can be lifted. When a top of gripper 23 is not positioned higher than the underside of flange 30, carrier 3 need not be lifted. If carrier 3 need not be lifted, a height h of the gripper as indicated in FIG. 9 can be made smaller than in the shown embodiment. In such a configuration the height h can be substantially equal to that of reversing wheel 31.

Figure 10:
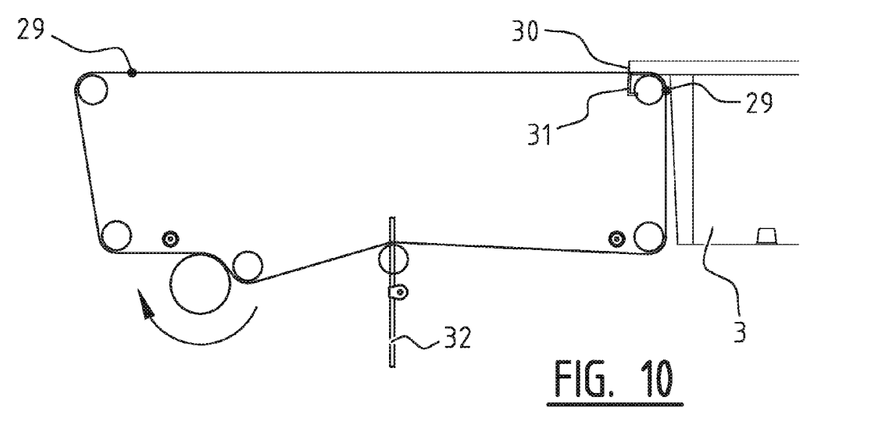
FIG. 10, FIG. 11 and FIG. 12 each show a view in various situations of a mechanism for picking up or storing carriers out of or in the storage area.
Figure 11:
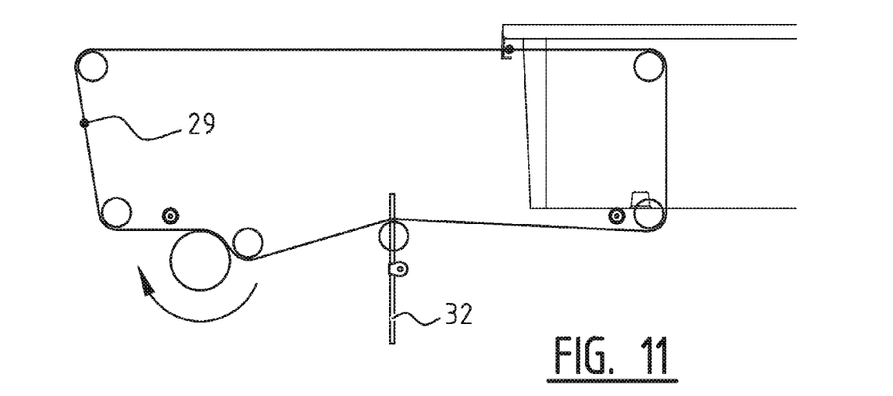
Figure 12:
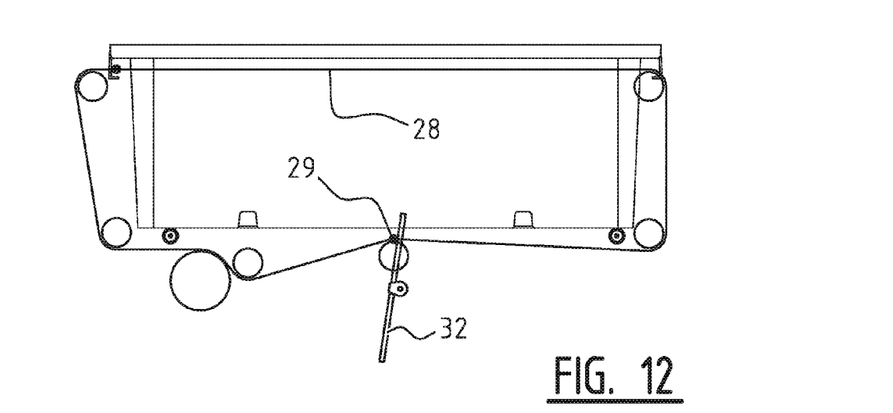

With a rod 29 in the space of flange 30 and side element 31 each carrier can be pulled out of shelving system 11 or, conversely, placed therein. When a position is reached where carrier 3 is wholly taken up in gripper 23, a second rod reaches a sensor arm 32 in FIG. 9 which is thereby pressed aside, and this can form an operation of a switch with which the motor can be switched off. Alternatively, a transmission between the motor and the chains 28 can be deactivated when second rod 29 makes contact with sensor arm 32. Returning a carrier 3 to the storage area takes place in reverse sequence, this being made possible by the space defined by flange 30 and side element 31. It makes no difference here whether rod 29 is pulled or pushed in this space. The above described sequence of engaging a carrier 3 with a rod in the space defined by flange 30 and side element 31, removing a carrier from the storage area and picking up the carrier in gripper 23 is shown in the successive FIGS. 10-12. Also shown here in more detail is sensor arm 32 which is connected to a switch in order to switch off the motor or to deactivate the transmission between the motor and the chains.

Described in the foregoing is a specific embodiment of a system according to the present invention as also shown in the accompanying figures. The invention is however not limited per se to any of the specific embodiments, since the invention is defined in the appended claims, in particular the single main claim number 1. A packaging on the carrier can close an access or opening to a space in the storage area instead of using a side wall on the bottom (plate) of the carrier. Described in the foregoing is a possible embodiment with a cooling which can be associated with the storage area. In another possible embodiment however, a carrier or a product or packaging on the bottom of the carrier can comprise a passive or active cooling. An electrical cooling element on or at the carrier or on or at the packaging, in the situation where it is placed in the space therefor in the storage area, can if desired be automatically connected when it is placed to an electric power supply for the cooling. The carrier or a packaging can also be cooled passively by means of a precooled cooling element or a piece of dry ice (frozen $CO_2$) which can be placed in a cavity or recess of the carrier or the packaging in order to cool products for at least some period of time, even when (active) cooling is not provided in the storage area itself. A deep-freeze temperature of −18° C. of products on the carrier or in the packaging can preferably be at least temporarily maintained using correct dimensioning and parameterization. It is further possible to apply a combination of cooling in the storage area and cooling in or of the product or the packaging. The storage area can for instance comprise a cooling for cooled products which keeps sections, segments or cells of the storage area at +4° C., while selected packagings (or products) are additionally cooled to at least initially −18° C. with an additional active or passive cooling associated with the packaging, such as the above mentioned dry ice, with which products in the packaging can be stored in the storage area for at least one 24-hour period at a temperature of a maximum of −18° C.

A packaging can be a box, container or case, and this packaging can additionally or alternatively form part of the system. This means that products (with or without their own associated packaging) can be placed in such a case, container or box for the duration of the accommodation in or at the system according to the present invention. When such products are dispensed, the carrier can be retrieved from a storage location and the relevant product (optionally in its own packaging) can be taken out of the container, case or box so as to be given to a customer or otherwise dispensed. The packaging, case, container or box can be embodied close-fittingly with the bottom and—if provided—the side wall of the carrier, or even take the place of at least the side wall.

Inside the storage area on one or two sides of a recess or a set of recesses conditioned air can be introduced into the space defined thereby. One side of the steel construction in which the products for conditioning are placed can for instance be provided with a double or cavity wall. The double wall forms a channel, for instance for (heated or cooled) air which is conditioned at a distant location and which can be forced using overpressure in the interior of the double or cavity walls to the space(s) defined by the recess or recesses. Holes or openings can be arranged at selected locations in the outer walls of the double or cavity walls in order to bring about outflow or blowing-out of conditioned air into the recess or recesses. Conditioned air being blown in provides for a uniform pressure buildup between the two walls. The side of the steel construction is provided here with perforations, holes or passages or openings, for instance over the whole surface, through which conditioned air escapes into or to the recess or recesses and the thereby defined space(s). An air speed can be controlled subject to the pressure and size/number of the perforations. In the steel construction of the storage area itself the carrier of the system is used, when placed, to partially close the location of a recess relative to the outside world. The space in the steel construction is hereby automatically conditioned. Products on the carrier can hereby be automatically placed in and removed from this space. The pressurized cavity wall hereby forms a part of the storage area, whereby conditioned storage is possible. At the same time the surrounding area remains substantially unaffected by these conditions. The steel construction on the other side of the storage unit can for instance be at room temperature here, whereby products with different conditioning can be handled in one system.

Embodiments of the present invention can comprise all possible and conceivable sensors and controls without departing from the scope of protection of the present invention, and this is likewise the case for all manner of possible and conceivable features, elements and components, to the extent these are not precluded in the definition of the scope of protection according to the appended claims, and in fact only the appended main claim.

The invention claimed is:

1. A storage and dispensing system for products and/or packagings, comprising:
    at least one carrier with at least a bottom which defines thereon a space for the products and/or packagings;
    a storage area, such as a storage rack or shelving system, for accommodating the carrier; and
    at least one transporter for selective displacement of the carrier from and/or to and into and/or out of the storage area, the at least one transporter including a control that controls a position, movement, and displacement of the at least one carrier;
    wherein the carrier in a situation where it is accommodated in the storage area comprises a gripping element on a side oriented outside the storage area, and the transporter comprises:
        a framework extending in a vertical direction and displaceable for horizontal movement over a rail or guide extending through the storage area from a feed location at a first side of the storage area to a discharge location at a second side of the storage area opposite the first side, the framework including a closed loop; and a gripping device arranged for vertical movement in the closed loop in the framework, the gripping device acting on the gripping element at least during a horizontal displacement of the carrier along the closed loop and into and/or out of the storage area, the control of the at least one transporter controlling a movement of the gripping device relative to the at least one transporter for communicating with the at least one carrier.

2. The system as claimed in claim 1, wherein the storage area comprises at least two shelving systems, racks or cabinets disposed opposite each other, and the transporter is displaceable therebetween.

3. The system as claimed in claim 1, wherein the storage area comprises at least two levels disposed one above the other in a shelving system configuration, wherein the transporter is displaceable along at least one side thereof.

4. The system as claimed in claim 1, wherein in a situation where it is placed in the storage area the carrier comprises a flange along or at least at one edge oriented outward out of the storage area.

5. The system as claimed in claim 4, wherein the gripping device of the transporter is configured to act selectively on the flange and to displace the carrier on the flange into and/or out of the storage area.

6. The system as claimed in claim 5, wherein the flange comprises a side element and the gripping device comprises a rod for moving under the flange and behind the side element and for moving the carrier along the closed loop when the rod is under the flange and behind the side element.

7. The system as claimed in claim 5, wherein the flange comprises a side element and the gripping device comprises at least one finger or at least one tooth for moving under the flange and behind the side element.

8. The system as claimed in claim 1, wherein the transporter connects to at least one of a feed and a discharge for respectively supplying and discharging the carrier respectively to and from the storage area.

9. The system as claimed in claim 8, further comprising: a processing station located opposite the at least one of the feed and the discharge relative to the storage area for the purpose of processing the carrier in respect of the product and/or the packaging.

10. The system as claimed in claim 9, wherein the transporter defines a path of movement for displacement of the carrier, and the processing station lies along the path of movement.

11. The system as claimed in claim 10, wherein the processing station defines a side track relative to the feed and the discharge.

12. The system as claimed in claim 1, wherein in a situation where it is placed in the storage area the carrier comprises an outward oriented side wall.

13. The system as claimed in claim 12, wherein the side wall comprises a seal round substantially the whole periphery thereof.

14. The system as claimed in claim 1, wherein the storage area comprises at least one recess for receiving the carrier therein.

15. The system as claimed in claim 14, wherein the recess comprises a cooling.

16. The system as claimed in claim 14, wherein the recess defines an entrance for selective infeed or removal of the carrier by means of the transporter, and the entrance to the recess can be substantially closed with the seal of the side wall of the carrier in a situation where the carrier is received in the recess.

17. A carrier configured for use in a system, the system comprising:

at least one carrier with at least a bottom which defines thereon a space for the products and/or packagings;

a storage area, such as a storage rack or shelving system, for accommodating the carrier; and at least one transporter for selective displacement of the carrier from and/or to and into and/or out of the storage area, the at least one transporter including a control that controls a position, movement, and displacement of the at least one carrier for communicating with the at least one carrier; wherein the carrier in a situation where it is accommodated in the storage area comprises a gripping element on a side oriented outside the storage area, and the transporter comprises:

a framework extending in a vertical direction and displaceable for horizontal movement over a rail or guide extending through the storage area from a feed location at a first side of the storage area to a discharge location at a second side of the storage area opposite the first side, the framework including a closed loop;

a gripping device arranged for vertical movement in the closed loop in the framework, the gripping device acting on the gripping element at least during horizontal displacement of the carrier along the closed loop and into and/or out of the storage area, the control of the at least one transporter controlling a movement of the gripping device relative to the at least one transporter for communicating with the at least one carrier.

18. A transporter configured for use in a system, the system comprising:

at least one carrier with at least a bottom which defines thereon a space for the products and/or packagings;

a storage area, such as a storage rack or shelving system, for accommodating the carrier; and at least one transporter for selective displacement of the carrier from and/or to and into and/or out of the storage area, the at least one transporter including a control that controls a position, movement, and displacement of the at least one carrier for communicating with the at least one carrier; wherein the carrier in a situation where it is accommodated in the storage area comprises a gripping element on a side oriented outside the storage area, and the transporter comprises:

a framework extending in a vertical direction and displaceable for horizontal movement over a rail or guide extending through the storage area from a feed location at a first side of the storage area to a discharge location at a second side of the storage area opposite the first side, the framework including a closed loop;

a gripping device arranged for vertical movement in the closed loop in the framework, the gripping device acting on the gripping element at least during a horizontal displacement of the carrier along the closed loop and into and/or out of the storage area, the control of the at least one transporter controlling a movement of the gripping device relative to the at least one transporter for communicating with the at least one carrier.

\* \* \* \* \*